US012674982B2

(12) United States Patent　　　(10) Patent No.:　US 12,674,982 B2
Voll et al.　　　　　　　　　　　 (45) Date of Patent:　Jul. 7, 2026

(54) POLYMER AEROGEL OPTICAL WAVEGUIDE

(71) Applicant: GOOGLE LLC, Mountain View, CA (US)

(72) Inventors: Constantin-Christian Alexander Voll, San Francisco, CA (US); Ali Karbasi, Los Gatos, CA (US)

(73) Assignee: GOOGLE LLC, Mountain View, CA (US)

( * ) Notice: Subject to any disclaimer, the term of this patent is extended or adjusted under 35 U.S.C. 154(b) by 257 days.

(21) Appl. No.: 18/466,958

(22) Filed: Sep. 14, 2023

(65) Prior Publication Data

US 2024/0094541 A1　　　Mar. 21, 2024

Related U.S. Application Data

(60) Provisional application No. 63/375,741, filed on Sep. 15, 2022.

(51) Int. Cl.
　G02B 27/01　　　(2006.01)
　G02B 1/04　　　(2006.01)

(52) U.S. Cl.
　CPC ......... G02B 27/0172 (2013.01); G02B 1/048 (2013.01); G02B 2027/0178 (2013.01)

(58) Field of Classification Search
　CPC ............... G02B 1/048; G02B 27/0172; G02B 2027/0178
　See application file for complete search history.

(56) References Cited

U.S. PATENT DOCUMENTS

| | | | | |
|---|---|---|---|---|
| 8,346,048 B2 * | 1/2013 | Bita | ..................... | G02B 6/0038 |
| | | | | 359/291 |
| 9,519,089 B1 * | 12/2016 | Brown | ..................... | G02B 5/18 |
| 11,105,982 B2 * | 8/2021 | Vora | .................. | G02B 27/0172 |
| 2012/0154196 A1 | 6/2012 | Cincotti et al. | | |

(Continued)

FOREIGN PATENT DOCUMENTS

| | | | | | |
|---|---|---|---|---|---|
| EP | 2157366 A1 * | 2/2010 | .......... | G02B 6/0076 |
| WO | WO-2020047340 A1 * | 3/2020 | .............. | G02B 5/30 |

OTHER PUBLICATIONS

Ozbakir, et al., "A new type of microphotoreactor with integrated optofluidic waveguide based on solid-air nanoporous aerogels", Royal Society Open Science, Oct. 18, 2018, retrieved from: https:// royalsocietypublishing.org/doi/epdf/10.1098/rsos.180802, 15 pages.

*Primary Examiner* — Daniel Petkovsek

(74) *Attorney, Agent, or Firm* — Brake Hughes Bellermann LLP

(57)　　　　　ABSTRACT

A head-up display, such as found in smart glasses, may include a light source configured to project light for display. A heads-up display may include a polymer aerogel optical waveguide configured to receive the light from the light source, guide the received light to an area in front of an eye of a user, and project the light to the eye of the user. The polymer aerogel optical waveguide can include a core portion made from a glass having a relatively high index of refraction and a cladding portion made from a polymer aerogel having a relatively low index of refraction so that light is guided in the core portion by total internal reflection at an interface between the core portion and the cladding portion.

16 Claims, 8 Drawing Sheets

(56)  References Cited

U.S. PATENT DOCUMENTS

| 2015/0177441 | A1 |  | 6/2015 | Sherman et al. | |
|---|---|---|---|---|---|
| 2017/0227702 | A1 |  | 8/2017 | Sherman et al. | |
| 2017/0307886 | A1 | * | 10/2017 | Stenberg | G02B 5/1842 |
| 2019/0056591 | A1 | * | 2/2019 | Tervo | G02B 6/0038 |
| 2019/0086674 | A1 | * | 3/2019 | Sinay | G02B 27/0093 |
| 2019/0094548 | A1 | * | 3/2019 | Nicholson | G02B 27/0176 |

* cited by examiner

310 — FABRICATING A POLYMER AEROGEL LAYER ON A TRANSFER FILM

320 — ADHERING THE POLYMER AEROGEL TO A GLASS LAYER

330 — REMOVING THE TRANSFER FILM FROM THE POLYMER AEROGEL LAYER

300

430

420

410

POLYMER AEROGEL

TRANSFER FILM

430

420

410

TRANSFER FILM

POLYMER AEROGEL

TRANSFER FILM

POLYMER AEROGEL OPTICAL WAVEGUIDE

CROSS-REFERENCE TO RELATED APPLICATION

This application claims the benefit of U.S. Provisional Application No. 63/375,741, filed on Sep. 15, 2022, the entire disclosure of which is incorporated by reference herein.

FIELD OF THE DISCLOSURE

The present disclosure relates to a heads-up display and more specifically to an optical waveguide for the heads up display.

BACKGROUND

A gel has a liquid component and a solid component. An aerogel can be formed by replacing the liquid component with a gas. For example, the liquid component may be extracted (e.g., by freeze-drying) and the remaining solid component may form a porous, low-density (e.g., 30%-70% air), solid structure.

SUMMARY

A polymer aerogel can provide a transparent low refractive index material for optical applications, such as waveguides. The polymer aerogel can be fabricated from a sol-gel coated on a core portion of the optical waveguide using a variety of coating techniques. The polymer aerogel may be affixed to a transfer film, which in a possible implementation is a pressure-sensitive adhesive. The polymer aerogel can be used to strengthen or protect an optical component. For example, a brittle, high-index glass core for an optical waveguide may be protected from damage by a polymer aerogel cladding. Further, gaps in a surface of an optical component may be filled by the polymer aerogel to prevent breakage.

In some aspects, the techniques described herein relate to a heads-up display including: a light source configured to project light for display on the heads-up display; and an optical waveguide configured to receive the light from the light source, the optical waveguide including: a core portion including a glass layer having a relatively-high index-of-refraction; and a cladding portion including a polymer aerogel layer having a relatively-low index-of-refraction, the glass layer and the polymer aerogel layer having an interface configured to provide total internal reflection so that the light is guided by the optical waveguide.

In some aspects, the techniques described herein relate to a method for assembling an optical waveguide including: fabricating a polymer aerogel layer on a transfer film, the polymer aerogel layer having a relatively-low index-of-refraction; adhering the polymer aerogel layer to a glass layer so that the polymer aerogel layer is between the glass layer and the transfer film, the glass layer having a relatively-high index-of-refraction; and removing the transfer film from the polymer aerogel layer to obtain: a core portion of the optical waveguide, the core portion including the glass layer having the relatively-high index-of-refraction; and a cladding portion of the optical waveguide, the cladding portion including the polymer aerogel layer having the relatively-low index-of-refraction, wherein the glass layer and the polymer aerogel layer define an interface configured to provide total internal reflection.

In some aspects, the techniques described herein relate to a head-worn device including: a light source configured to project light; a lens including an optical waveguide configured to receive the light from the light source, the optical waveguide including: a core portion including a glass layer having a relatively-high index-of-refraction; and a cladding portion including polymer aerogel layer having a relatively-low index-of-refraction, the glass layer and the polymer aerogel layer having an interface configured to provide total internal reflection so that the light is guided by the optical waveguide; an in-coupling grating configured to couple the light into the core portion of the optical waveguide; and an out-coupling grating configured to couple the light out of the core portion of the optical waveguide and towards an eye of a user.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
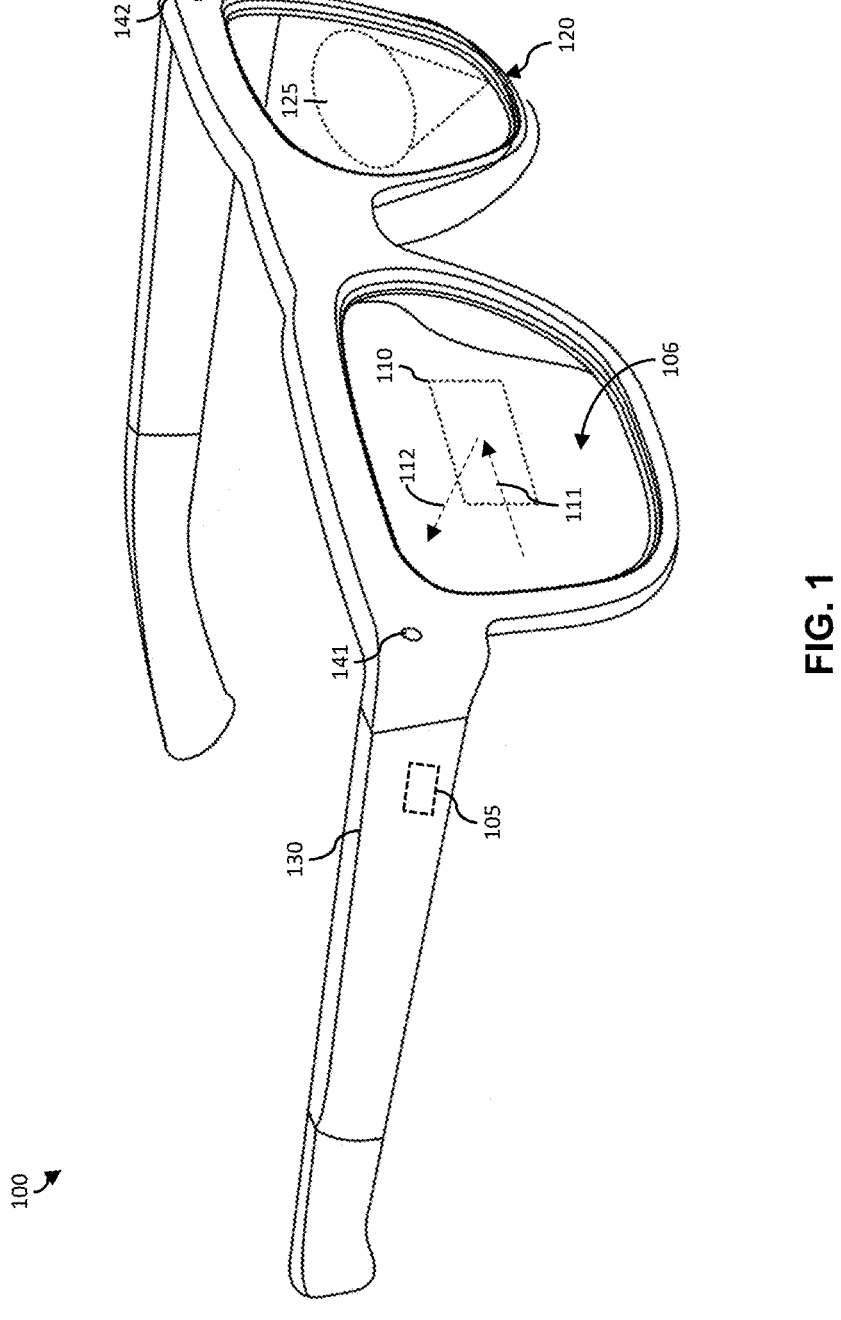
FIG. 1 is a head-worn device according to a possible implementation of the present disclosure.

A head-worn device may include a heads-up display. The heads-up display (HUD) may use an optical waveguide that can guide light across a field of view of the user towards a point in front of an eye of a user. The optical waveguide may further include an output coupling section that can project the guided light towards the user's eye. For example, the heads-up display may be included in augmented-reality (AR) glasses to convey light from a source in a frame of the glasses to the eye of a user. In these applications, it may be desirable for the optical waveguide to have low optical scatter, high optical transparency, and to have no visible color in order to remain unnoticed by a user looking through the heads-up display. Additionally, it may be desirable for the optical waveguide to be mechanically robust to endure an environment common to consumer use.

An optical waveguide may include a core portion (i.e., core) and a cladding portion (i.e., cladding) with different indices of refraction. For light to be guided in the core, the core may have a larger index of refraction (i.e., index) than the cladding. In some implementations, it may be desirable for the index difference between the core and the cladding to be as large as possible. Accordingly, it may be desirable to use a material having a very high index ($n_{glass}$>1.5) for the core of the optical waveguide and to use a material having a very low index ($n_{core}$<1.3) for the cladding of the optical waveguide.

One technical problem associated with optical waveguides used for HUDs is that a high index glass suitable for use as a core material is fragile. Glass with a very high index can be brittle and break easily. Accordingly, it may be desirable to select a cladding that can protect the core glass from breakage. Another technical problem associated with optical waveguides used for HUDs is that a cladding material must have mechanical properties to prevent breakage, while also having the optical properties, mentioned above, to prevent a user from noticing it. For example, it may be desirable for the cladding material to be highly transparent (e.g., low haze, no color, etc.) and to be mechanically robust (e.g., flexible).

The porous, low-density solid structure of an aerogel can provide strength and structure while at the same time can have a low index of refraction. These properties can make them attractive for some optical components and assemblies. The present disclosure describes a polymer aerogel used as cladding for an optical waveguide for a HUD display. The polymer aerogel can have good optical transmission including low absorption and low optical scatter in the visible region of the electromagnetic spectrum. The polymer aerogel can be made relatively thick (e.g., ≥50 microns) without being brittle. Additionally, the polymer aerogel may provide scratch resistance, adhesion, and hydrophobicity. The polymer aerogel can have a very low density (e.g., 0.4-0.9 gram/cm³) and can be assembled into an optical waveguide using a variety of possible assembly methods.

FIG. 1 is a head-worn device according to a possible implementation of the present disclosure. As shown, the head-worn device may be implemented as smart glasses, which can be configured for augmented reality (i.e., AR).

The head-worn device 100 includes a frame 130 that is configured to support and position a left lens in front of a left eye of the user and support and position a right lens in front of a right eye of the user. The frame 130 may further contain electronics to enable sensing and a heads-up display for augmented reality. For example, the frame 130 may include a battery, a processor, a memory (e.g., non-transitory computer readable medium), electronics to support sensors (e.g., cameras, depth sensors, etc.), at least one position sensor (e.g., an inertial measurement unit), interface devices (e.g., speakers, display, network adapter, etc.), and a light source 105 for the heads-up display.

The left lens, a right lens, or both lenses of the head-mounted device may be configured to operate as a heads-up display. The heads-up display may be optically clear (i.e., colorless) so that the heads-up display does not (significantly) attenuate or filter (i.e., color) the light passing through the heads-up display. In particular, the heads-up display may be substantially transparent (>90% transparency) for a range of visible wavelengths (e.g., 400 nanometers to 700 nanometers). The heads-up display may be configured to transmit (i.e., pass) the range of visible wavelengths with very little (e.g., less than 10%) attenuation or scattering.

The heads-up display may have an area that substantially (e.g., >95%) matches an area of a lens 106 (or lenses) of the head-worn device 100. The lens 106 may be configured as an optical waveguide that can guide light along a guided path 111 towards an area 110 in front of the user's eye (e.g., in a user's field of view). The lens 106 may further include a first optical component (e.g., grating) configured to redirect the guided light to a free-space path 112. The redirected light can be focused by the eye of the user to view information displayed on the heads-up display. The lens may further include a second optical component (e.g., grating) configured to couple light from the light source 105 into the optical waveguide.

A user wearing the head-worn device 100 can view information displayed in the heads-up display corresponding to the lens (or lenses) so that the user can view virtual elements within their natural field of view. For example, information (e.g., images, graphics, text, icons, etc.) may be displayed on the lens 106 so that a user may view the information as the user looks through the lens 106. In this way, information can be displayed so that it can overlap with the user's view of the environment in an augmented reality experience.

The head-worn device can further include a first camera 141 that is directed to a first camera field-of-view that overlaps with the natural field-of-view of the eyes of the user when the glasses are worn. In other words, the first camera 141 can capture images of a view aligned with a point-of-view (POV) of a user (i.e., an egocentric view of the user).

In a possible implementation, the head-worn device 100 can further include a second camera 142 that is directed to a second camera field-of-view that overlaps with the natural field-of-view of the eyes of a user when the glasses are worn. The second camera 142 and the first camera 141 may be configured to capture stereoscopic images of the field of view of the user that includes depth information about objects in the field of view of the user.

The head-worn device 100 can further include an eye-tracking camera 120. The eye-tracking camera 120 can be located in a portion of the frame so that an eye-FOV 125 of the eye-tracking camera 120 includes the eye of the user when the head-worn device 100 is worn.

Figure 2:
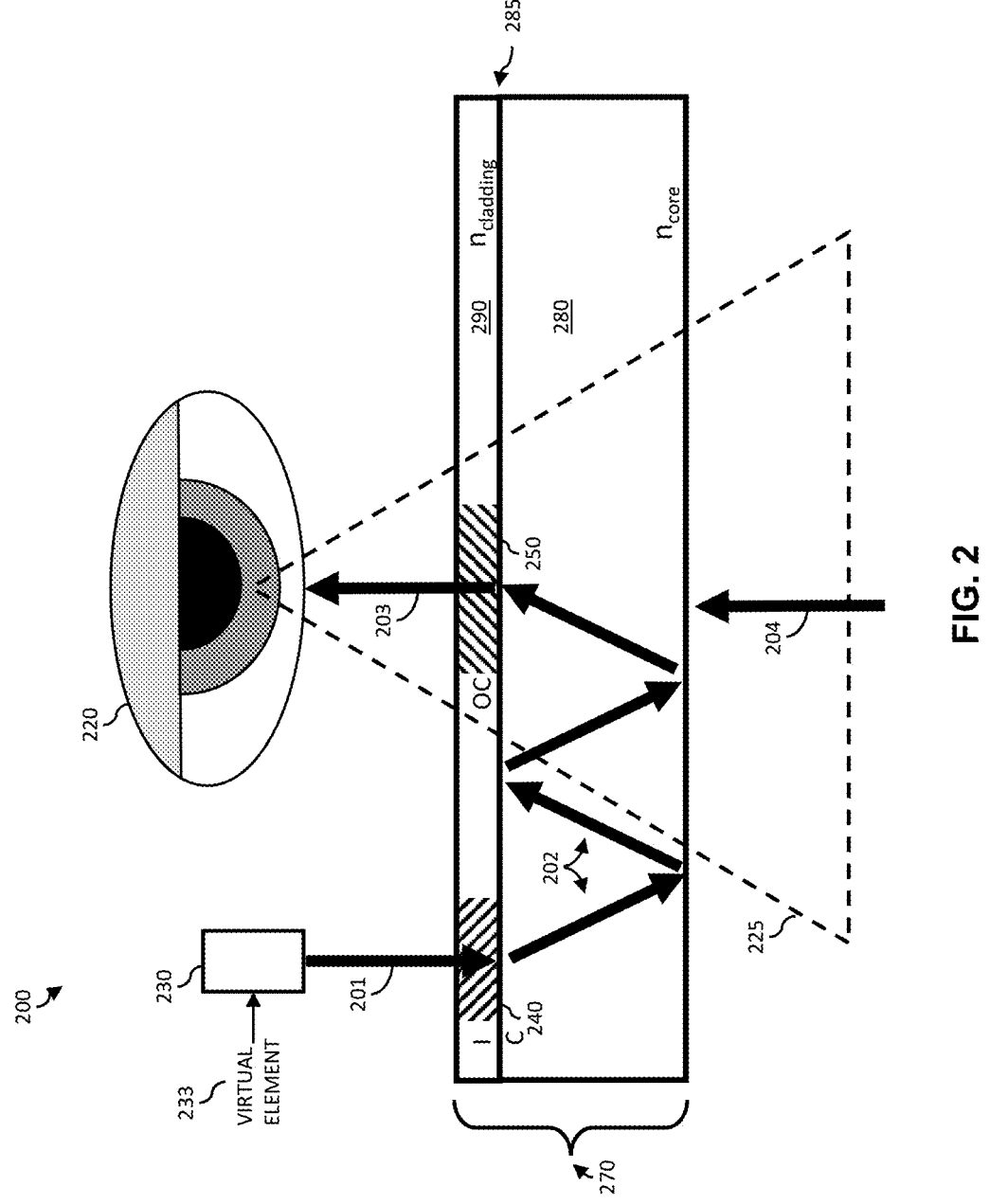
FIG. 2 is a heads-up display including an optical waveguide according to a possible implementation of the present disclosure.

FIG. 2 is a heads-up display including an optical waveguide according to a possible implementation of the present disclosure. The heads-up display 200 may be configured to present images to an eye 220 that are overlaid with a field-of-view 225 of the user. Accordingly, the images may be part of an augmented-reality (AR) environment.

As shown, the heads-up display 200 includes a light source 230. The light source 230 may be configured to generate/direct transmitted light 201 to an optical waveguide 270. The transmitted light 201 may be from a visible portion of the electromagnetic spectrum and may be modulated (e.g., in space, in time) according to information for display. For example, the transmitted light 201 from the light source 230 may be controlled according to an electronic signal corresponding to a virtual element 233 so that the light 201 received by the eye 220 can form a visual image corresponding to the virtual element 233.

The optical waveguide 270 includes an in-coupling grating 240 (i.e., IC) to couple the transmitted light 201 to a core portion (i.e., core layer, core) of the waveguide where it can be guided as guided light 202 by total internal reflection (i.e., TIR) at an interface 285 between the core portion and a cladding portion of the optical waveguide 270. The optical waveguide 270 further includes an out-coupling grating 250 (i.e., OC), which is configured to couple the guided light 202 out of the optical waveguide 270 as projected light 203 directed towards an eye 220 of a user. The projected light 203 from the optical waveguide 270 can be focused by the eye 220 of the user for viewing display content (e.g., virtual element 233). Additionally, ambient light 204 from the environment can pass through the optical waveguide 270 and be focused by the eye of the user for viewing an environment of the user.

The optical waveguide 270 includes a core portion (i.e., core layer, core) and a cladding portion (i.e., cladding layer, cladding). The core portion can include (e.g., can be) a glass layer 280 having a glass index ($n_{glass}$), while the cladding portion can include (e.g., can be) a polymer aerogel layer 290 having an aerogel index ($n_{aerogel}$). For example, the polymer aerogel layer 290 may have an aerogel index that is low (e.g., $1.1 \leq n_{aerogel} \leq 1.3$) compared to the index of the glass layer 280. In other words, the core portion of the optical waveguide 270 has an index-of-refraction ($n_{core} \geq 1.5$) that is higher than the index-of-refraction ($1.1 \leq n_{cladding} \leq 1.3$) of the cladding portion of the optical waveguide 270. The relatively low index of refraction may result from the physical structure of the polymer aerogel layer having a very low density.

Figure 3:
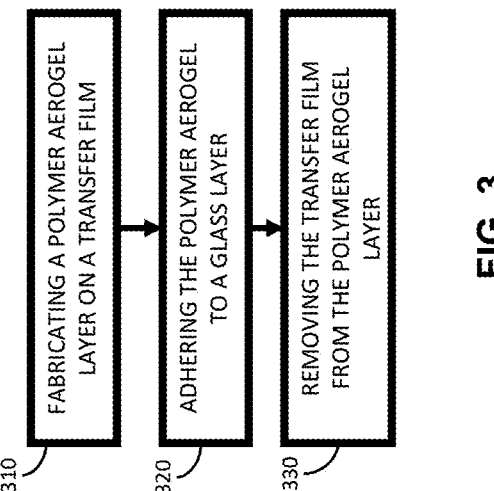
FIG. 3 is a flowchart of a method for assembling an optical waveguide according to a possible implementation of the present disclosure.

FIG. 3 is a flowchart of a method for assembling an optical waveguide, such as shown in FIG. 2. The method includes fabricating 310 a polymer aerogel layer on a transfer film. The polymer aerogel layer may be fabricated by combining a liquid with the polymer and then to form a gel and then removing the liquid from the gel.

Polymers that may be used in implementations of the present disclosure include poly(meth)acrylates, polycarbonates, polyesters, cyclic olefin polymers (COP), cyclic olefin copolymers (COC), and silicon. These polymers may be optically transparent at visible wavelengths of the optical spectrum and can be flexible.

Fabricating the polymer aerogel layer on the transfer film may further include adhering the polymer aerogel layer to a transfer film (i.e., carrier). The transfer film may serve as a substrate on which the aerogel can be formed and can provide packaging (e.g., support, protection) for the aerogel during transport or otherwise prior to assembly in an optical component (e.g., waveguide). In a possible implementation, a sol-gel of the polymer may be coated on the transfer film through standard coating techniques (e.g., spin-coating, dip-coating, spray-coating, blade coating) and processed to remove the liquid in order to fabricate the polymer aerogel layer on the transfer film.

Figure 4A:
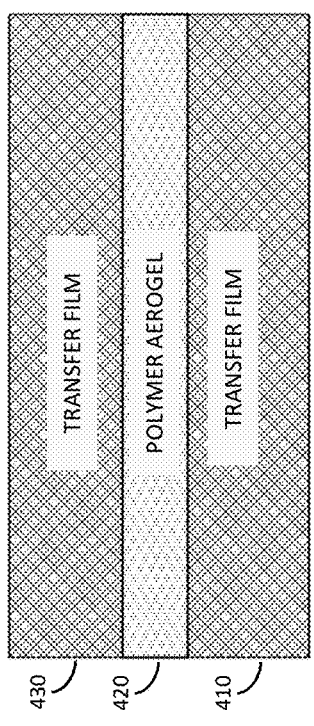
FIG. 4A illustrates a transparent polymer aerogel fabricated on a transfer film according to a possible implementation of the present disclosure.

FIG. 4A illustrates a (transparent) polymer aerogel layer 420 fabricated on a transfer film according to a possible implementation of the present disclosure. The transparent polymer aerogel layer can be formed by coating the layer on a side of a transfer film 410 (i.e., transfer film layer). For example, a sol-gel of the polymer may be coated on the transfer film 41 through standard coating techniques (e.g., spin-coating, dip-coating or spray-coating) and processed to produce the transparent polymer aerogel on the transfer film.

In a possible implementation, fabricating the polymer aerogel layer on the transfer film may include disposing the polymer aerogel layer between a first transfer film and a second transfer film.

Figure 4B:
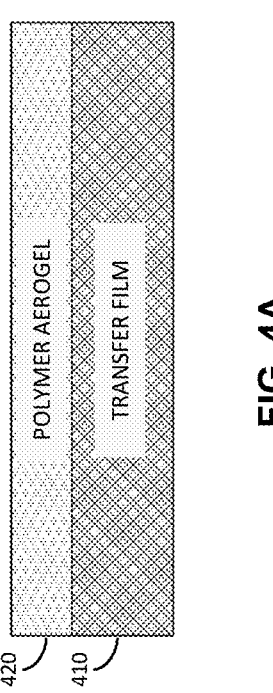
FIG. 4B illustrates a transparent polymer aerogel disposed between transfer film layers according to a possible implementation of the present disclosure.

FIG. 4B illustrates a transparent polymer aerogel disposed between a first transfer film 410 and a second transfer film 430 according to a possible implementation of the present disclosure. As shown, the transparent polymer aerogel is formed between a first transfer film layer and a second transfer film layer. The fabrication process may include coating the first transfer film 410 as described above. The fabrication process may further include adhering the second transfer film 430 to the polymer aerogel layer 420 on the side opposite to the side coupled to the first transfer film 410. For example, the polymer aerogel layer 420 may have an adhesion property that allows it to bond with the second transfer film 430. The adhesion may include a curing step. For example, radiation curing may be used (e.g., ultraviolet curing).

Returning to FIG. 3, the method 300 for assembling the optical waveguide may further include adhering 320 the polymer aerogel layer to a glass layer. After adhering 320 the polymer aerogel layer to the glass layer, the method 300 may include removing 330 the transfer film from the polymer aerogel layer. What remains, after removing 330 the transfer film, is an optical waveguide in which the core portion includes (e.g., is) the glass layer and the cladding portion includes the polymer aerogel layer (e.g., the cladding portion may be entirely the polymer aerogel layer). Light incident on an interface (i.e., boundary) between the glass layer and the polymer aerogel layer can experience total internal reflection.

Figure 5:
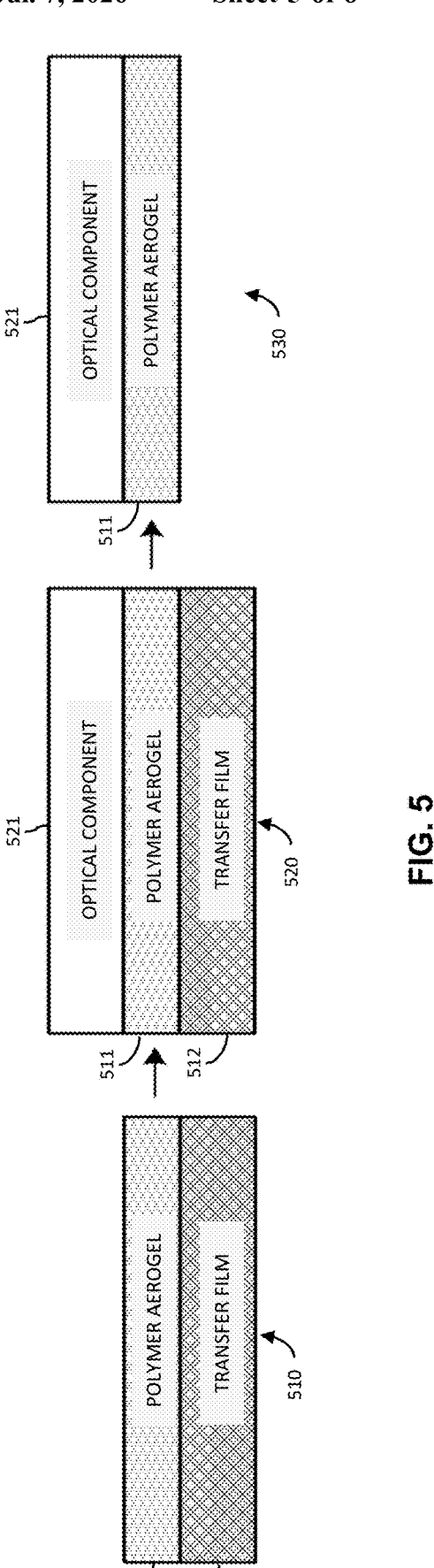
FIG. 5 visually illustrates an assembly process for an optical waveguide according to a possible implementation of the present disclosure.

FIG. 5 visually illustrates an assembly process for an optical waveguide according to a possible implementation of the present disclosure. In a first step, the aerogel may be fabricated on a transfer film. The aerogel on the transfer film may be suitable for shipping or storage until needed for assembly. In a second step of the assembly process, an optical component (e.g., waveguide core) may be bonded to the transparent polymer aerogel. For example, a glass core may be bonded to the transparent polymer aerogel. In a third step of the assembly process, the transfer film may be removed from the polymer aerogel. In a possible implementation, the assembly process is for an optical waveguide where the optical component is the core of the waveguide and the polymer aerogel is the cladding of the optical waveguide.

In a possible implementation, the transfer film may be a pressure-sensitive adhesive (PSA). FIG. 4A illustrates a transparent polymer aerogel fabricated on a PSA film according to a possible implementation of the present disclosure. As shown, the transparent polymer aerogel is formed (e.g., coated) as a layer on a side of a PSA film. For example, a sol-gel of the polymer may be coated on the PSA film through standard coating techniques (e.g., spin-coating, dip-coating or spray-coating) and processed to produce the transparent polymer aerogel on the PSA film.

FIG. 4B illustrates a transparent polymer aerogel disposed between PSA layers according to a possible implementation of the present disclosure. As shown, the transparent polymer aerogel is formed between a PSA film and a PSA film. The fabrication process may include coating the first PSA film as described above. The fabrication process may further include adhering the second PSA film to the polymer aerogel on the side opposite to the side coupled to the first PSA film. For example, the aerogel may have an adhesion property that allows it to bond with the second PSA film. The adhesion may include a curing step. For example, radiation curing may be used (e.g., ultraviolet curing).

In a possible implementation, the transparent polymer aerogel may be fabricated directly on the optical component. This may advantageously avoid the assembly steps for removing the transfer film but may be less convenient.

FIG. 5 illustrates a transparent polymer aerogel fabricated directly on an optical component according to a possible implementation of the present disclosure. As shown, in a first operation 510 a polymer aerogel layer 511 is fabricated on a transfer film 512. The fabrication can include coating a solution (e.g., colloidal solution) in a gel (i.e., sol-gel) on a transfer film and removing (e.g., drying) liquid from the sol-gel so that the polymer aerogel layer 511 remains on the transfer film 512. For example, a sol-gel of the polymer may be coated on the optical waveguide through standard coating techniques (e.g., spin-coating, dip-coating or spray-coating) and processed (i.e., to remove liquid) to produce the transparent polymer aerogel on the waveguide.

A second operation 520 includes applying the polymer aerogel to an optical component 521 (e.g., glass layer). The polymer aerogel layer 511 may have an adhesive property so that pressing it against the optical component 521 (e.g., with applied heat) can mechanically couple (i.e., adhere) the polymer aerogel layer 511 to the optical component 521. A third operation 530 includes removing the transfer film 512 from the polymer aerogel layer 511 so that what remains is an optical component 521 and polymer aerogel layer 511 stack-up.

Figure 6B:
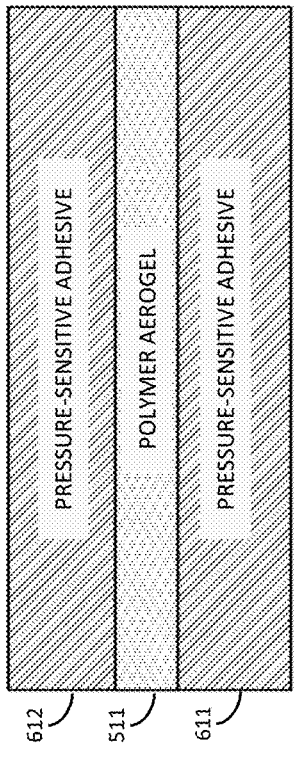
FIG. 6B illustrates a transparent polymer aerogel disposed between PSA layers according to a possible implementation of the present disclosure.
Figure 6A:
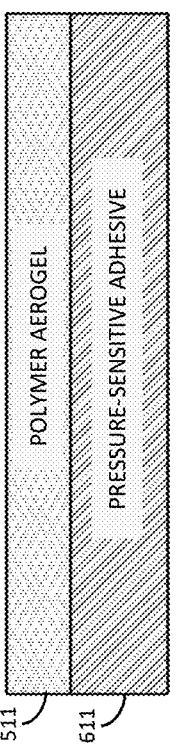
FIG. 6A illustrates a transparent polymer aerogel fabricated on a PSA film according to a possible implementation of the present disclosure.

In an alternate implementation a pressure-sensitive adhesive (PSA) may be used to adhere the polymer aerogel layer 511 to the optical component 521. As shown in FIG. 6A, this may include forming (i.e., fabricating) the polymer aerogel layer 511 on a first pressure-sensitive adhesive layer 611. For implementations in which the polymer aerogel layer 511 is sandwiched between a first optical component (e.g., first glass layer) and a second optical component (e.g., second glass layer), a second pressure-sensitive adhesive layer 612 may be applied to the polymer aerogel layer 511, as shown in FIG. 6B, which illustrates a transparent polymer aerogel disposed between PSA layers according to a possible implementation of the present disclosure.

Applying the polymer aerogel directly to the optical component 521 may have the advantage of allowing it to fill mechanical deviations from the planar surface (i.e., features) on a surface of an optical component 521.

In a possible implementation the optical component 521 includes a grating. The grating may include small (e.g., micron) features on a surface of the optical component facing the polymer aerogel layer 511. The features may include air gaps that are fragile. The air gaps may be filled by the polymer aerogel layer 511 to strengthen the features without significantly altering the optical properties of the grating. In other words, the polymer aerogel can be used to mechanically protect the grating from damage (e.g., due to handling, vibration, shock, etc.).

Figure 7A:
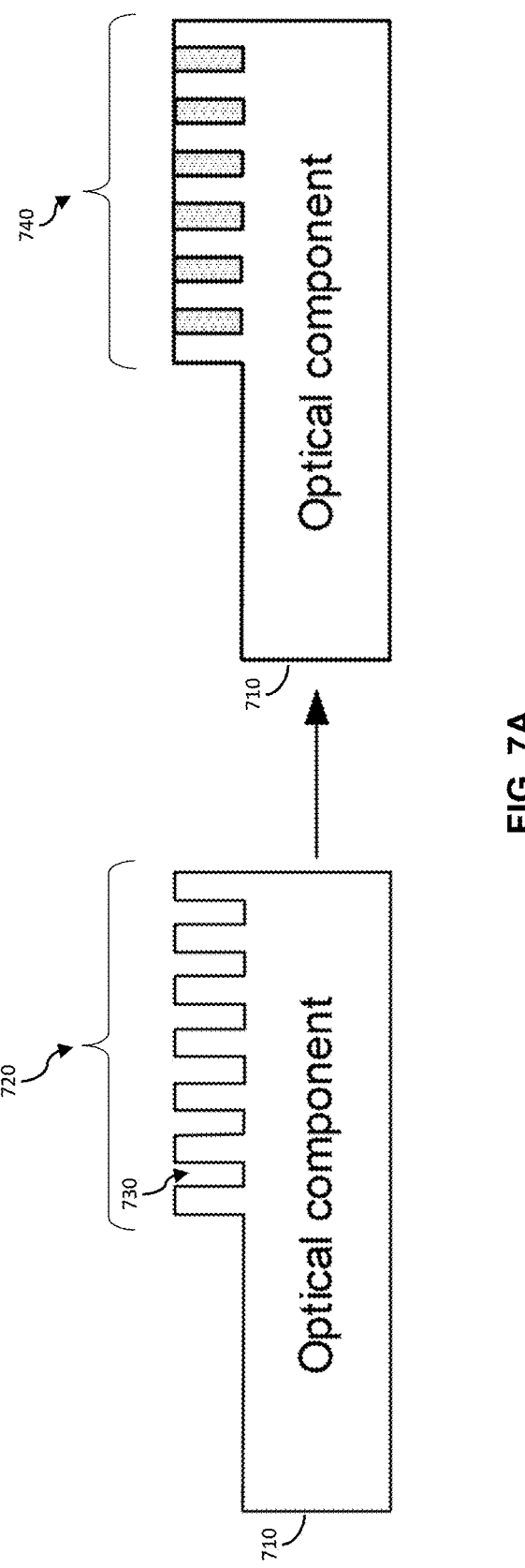
FIG. 7A illustrates an optical grating strengthened by a polymer aerogel according to a first possible implementation of the present disclosure.

FIG. 7A illustrates an optical grating strengthened by a polymer aerogel according to a first possible implementation of the present disclosure. As shown, an optical component 710 (e.g., glass layer, lens, etc.) can include a air-gap grating 720 that defines (i.e., includes) a plurality of air gaps (i.e., gaps) in a surface of the optical component 710. Using the techniques described above the polymer aerogel may be applied to the air-gap grating 720 so that the polymer aerogel layer fills the gaps 730 to form a polymer-aerogel-gap grating 740, which may more mechanical strength (e.g., rigidity) than the air-gap grating 720.

Figure 7B:
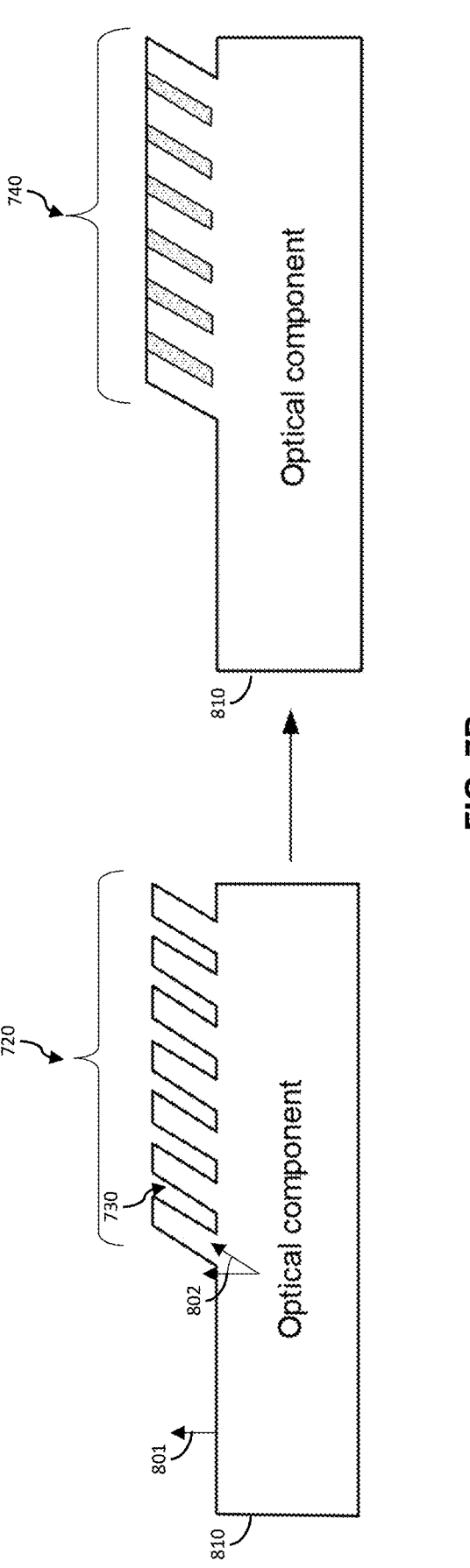
FIG. 7B illustrates an optical grating strengthened by a polymer aerogel according to a second possible implementation of the present disclosure.

FIG. 7B illustrates an optical grating strengthened by a polymer aerogel according to a second possible implementation of the present disclosure. As shown, an optical component 810 (e.g., glass layer, lens, etc.) can include a air-gap grating 720 that defines (i.e., includes) a plurality of air gaps (i.e., gaps) in a surface of the optical component 710. In this implementation each air gap 730 is at an angle 802 with respect to the surface (i.e., surface normal 801) of the optical component 810. Using the techniques described above the polymer aerogel may be applied to the air-gap grating 720 so that the polymer aerogel layer fills the gaps 730 to form a polymer-aerogel-gap grating 740, which may more mechanical strength (e.g., rigidity) than the air-gap grating 720.

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Some implementations may be implemented using various semiconductor processing and/or packaging techniques. Some implementations may be implemented using various types of semiconductor processing techniques associated with semiconductor substrates including, but not limited to, for example, Silicon (Si), Gallium Arsenide (GaAs), Gallium Nitride (GaN), Silicon Carbide (SiC) and/or so forth.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

It will be understood that, in the foregoing description, when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

The invention claimed is:

1. A heads-up display comprising:
a light source configured to project light for display; and
an optical waveguide including:
 a core portion including a glass layer having a first index-of-refraction;
 an in-coupling grating configured to couple light from the light source into the core portion; and
 a cladding portion including a polymer aerogel layer having a second index-of-refraction, the glass layer and the polymer aerogel layer having an interface configured to provide total internal reflection so that the coupled light is guided in the core portion between the in-coupling grating and an out-coupling grating, the out-coupling grating configured to couple the guided light out of the core portion and towards an eye of a user, wherein the in-coupling grating and the out-coupling grating define gaps in a surface of the glass layer of the core portion, the gaps being filled with the polymer aerogel layer of the cladding portion, wherein the polymer aerogel layer has an adhesive property such that the polymer aerogel layer is adhered to the surface of the glass layer, without an intervening adhesive layer.

2. The heads-up display according to claim 1, wherein the light source and the optical waveguide are included in smart glasses.

3. The heads-up display according to claim 1, wherein the polymer aerogel layer is substantially transparent at visible wavelengths of the optical spectrum.

4. The heads-up display according to claim 3, wherein the polymer aerogel layer is colorless.

5. The heads-up display according to claim 1, wherein the polymer aerogel layer is at least 50 microns thick.

6. The heads-up display according to claim 1, wherein the second index-of-refraction ($n_{aerogel}$) of the polymer aerogel layer is in a range between 1.1 and 1.3, inclusive ($1.1 \leq n_{aerogel} \leq 1.3$).

7. The heads-up display according to claim 6, wherein the first index-of-refraction ($n_{glass}$) of the glass layer is greater than or equal to 1.5 ($n_{glass} \geq 1.5$).

8. The heads-up display according to claim 1, wherein the polymer aerogel layer is fabricated from a sol-gel including a poly(meth)acrylate polymer, a polycarbonate polymer, a polyester polymer, a cyclic olefin polymer (COP), a cyclic olefin copolymer (COC), or a silicone polymer.

9. A head-worn device comprising:
a light source configured to project light; and
a lens including:
 an optical waveguide configured to receive the light from the light source, the optical waveguide including:
  a core portion including a glass layer having a first index-of-refraction;
  an in-coupling grating configured to couple the light from the light source into the core portion of the optical waveguide; and
  a cladding portion including a polymer aerogel layer having a second index-of-refraction, the glass layer and the polymer aerogel layer having an interface configured to provide total internal reflection so that the coupled light is guided by the optical waveguide in the core portion between the in-coupling grating and an out-coupling grating, the out-coupling grating configured to couple the guided light out of the core portion of the optical waveguide and towards an eye of a user, wherein the in-coupling grating and the out-coupling grating define gaps in a surface of the glass layer of the core portion, the gaps being filled with the polymer aerogel layer of the cladding portion, wherein the polymer aerogel layer has an adhesive property such that the polymer aerogel layer is adhered to the surface of the glass layer without an intervening adhesive layer.

10. The head-worn device according to claim 9, wherein the polymer aerogel layer is substantially transparent at visible wavelengths of the optical spectrum.

11. The head-worn device according to claim 10, wherein the polymer aerogel layer is colorless.

12. The head-worn device according to claim 9, wherein: the head-worn device is smart glasses.

13. The head-worn device according to claim 9, wherein the polymer aerogel layer is at least 50 microns thick.

14. The head-worn device according to claim 9, wherein the second index-of-refraction ($n_{aerogel}$) of the polymer aerogel layer is in a range between 1.1 and 1.3, inclusive ($1.1 \leq n_{aerogel} \leq 1.3$).

15. The head-worn device according to claim 14, wherein the first index-of-refraction ($n_{glass}$) of the glass layer is greater than or equal to 1.5 ($n_{glass} \geq 1.5$).

16. The head-worn device according to claim 9, wherein the polymer aerogel layer is fabricated from a sol-gel including a poly(meth)acrylate polymer, a polycarbonate polymer, a polyester polymer, a cyclic olefin polymer (COP), a cyclic olefin copolymer (COC), or a silicone polymer.

* * * * *